US006707947B1

(12) United States Patent
Shinohara et al.

(10) Patent No.: US 6,707,947 B1
(45) Date of Patent: Mar. 16, 2004

(54) FRAME SWITCHER AND METHOD OF SWITCHING, DIGITAL CAMERA, AND MONITORING SYSTEM

(75) Inventors: Toshiaki Shinohara, Omiya (JP); Kengo Tsuzuki, Machida (JP); Yuhi Sasaki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 476 days.

(21) Appl. No.: 09/589,348

(22) Filed: Jun. 8, 2000

(30) Foreign Application Priority Data

Sep. 22, 1999 (JP) .......................................... 11-269132

(51) Int. Cl.[7] ................................................ G06K 9/36

(52) U.S. Cl. ...................................................... 382/236

(58) Field of Search ................................ 382/232, 236; 348/387.1, 388.1, 426.1, 432.1, 433.1, 464, 473, 584; 375/240, 240.03–240.07, 240.25

(56) References Cited

U.S. PATENT DOCUMENTS

| | | | | | |
|---|---|---|---|---|---|
| 5,600,376 | A | | 2/1997 | Casavant et al. | |
| 5,793,425 | A | * | 8/1998 | Blakrishnan | 348/387.1 |
| 6,226,326 | B1 | * | 5/2001 | Mihara | 375/240.05 |
| 6,229,849 | B1 | * | 5/2001 | Mihara | 375/240.05 |
| 6,414,998 | B1 | * | 7/2002 | Yoshinari et al. | 375/240.05 |

FOREIGN PATENT DOCUMENTS

| | | | |
|---|---|---|---|
| EP | 0637168 | A1 | 2/1995 |
| EP | 0776130 | A2 | 5/1997 |
| EP | 0895421 | A2 | 2/1999 |
| EP | 0938237 | A2 | 8/1999 |
| GB | 2307151 | A | 5/1997 |
| JP | 5111014 | | 4/1993 |
| JP | 7250322 | | 9/1995 |

OTHER PUBLICATIONS

Partial European Search Report dated Nov. 1, 2001.

Patent Abstracts of Japan, vol. 1996, No. 06, Jun. 28, 1996 & JP 08037614 A (Kyocera Corp), Feb. 6, 1996, abstract.

Lari, et al.: "Video Compression Based on Camera Motion", Signals, Systems and Computers, 1992. 1992 Conference Record of the Twenty–Sixth Asilomar Conference on Pacific Grove, CA, USA Oct. 26–28 1992, Los Alamitos, CA, USA IEEE Comput. Soc. US, Oct. 26, 1992, pp. 1004–1010, XP010031076, ISBN: 0–8186–3160–0, abstract.

* cited by examiner

*Primary Examiner*—Jose L. Couso

(74) *Attorney, Agent, or Firm*—Stevens, Davis, Miller & Mosher, LLP.

(57) ABSTRACT

An image data transmission system reduces a delay resulting from compression processing of image data. The image data transmission system comprises cameras for compress encoding image data and transmitting compress-encoded image data, a decoder, a control device, monitors, and a LAN. Upon selection of a camera from the control device for control, the control device acquires information on capabilities of the cameras through the LAN. When a function which is affected by a delay due to the compress-encoding is used from among functions of the controlled camera, compress-encoding that reduces the delay is performed in the camera.

23 Claims, 15 Drawing Sheets

FIG. 3

(INFORMATION INHERENT TO DEVICE)

• PRODUCT INFORMATION (VENDOR ID / PRODUCT NUMBER)

(INFORMATION ON CAPABILITES OF DEVICE)

REAL TIME CONTROL FUNCTIONS

| | |
|---|---|
| PAN | YES / NO |
| TILT | YES / NO |
| ZOOM | YES / NO |
| FOCUS | YES / NO |
| EXTERNAL CONTROL SW | YES / NO |

FIG. 4A

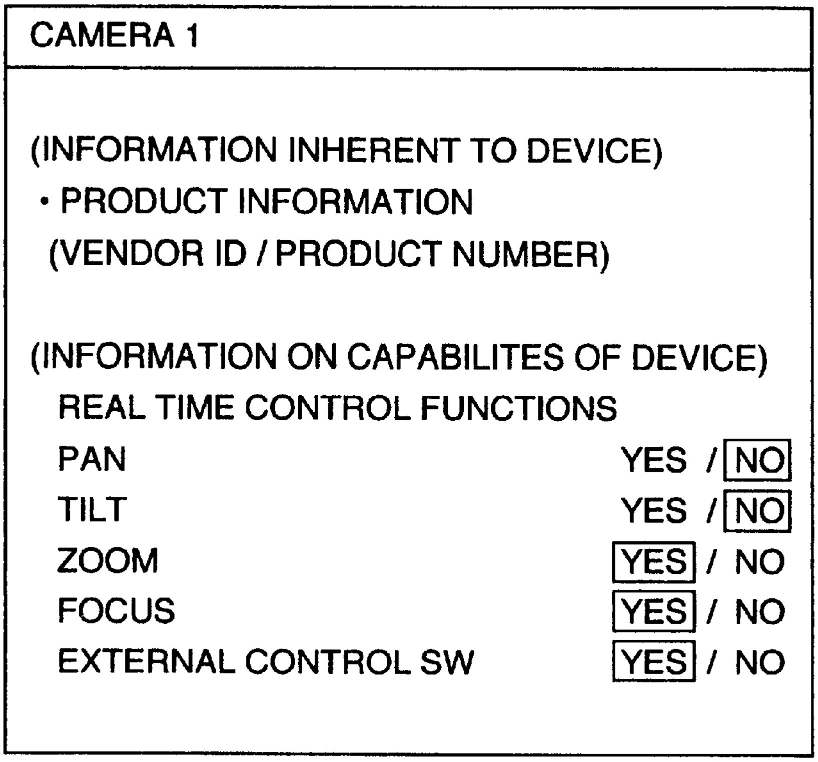

FIG. 4B

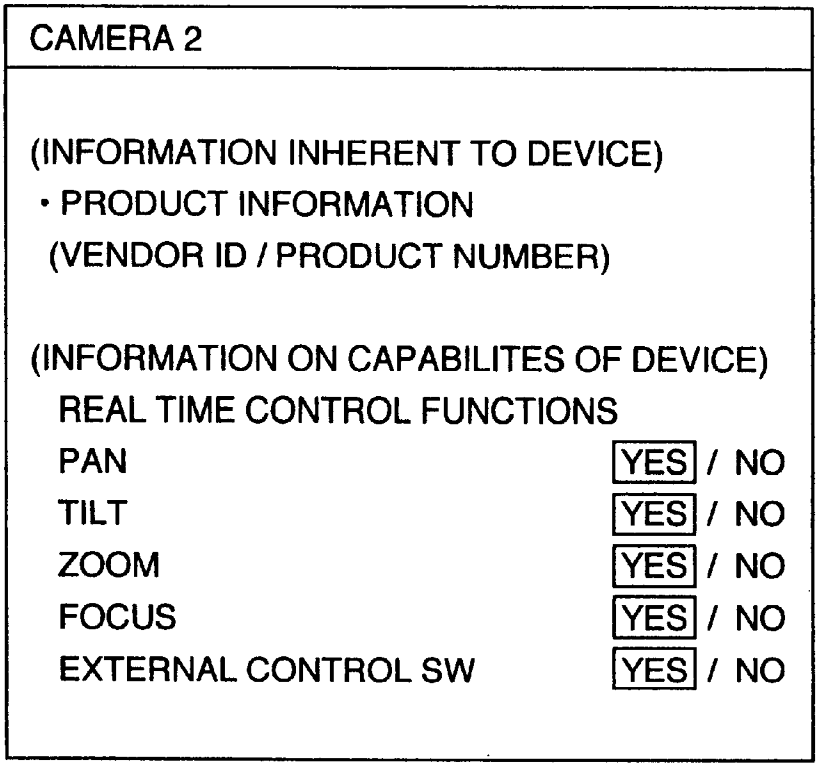

| CAMERA 1 | |
|---|---|
| (INFORMATION INHERENT TO DEVICE) | |
| • PRODUCT INFORMATION | |
| (VENDOR ID / PRODUCT NUMBER) | |
| | |
| (INFORMATION ON CAPABILITES OF DEVICE) | |
| REAL TIME CONTROL FUNCTIONS | |
| PAN | YES / [NO] |
| TILT | YES / [NO] |
| ZOOM | [YES] / NO |
| FOCUS | [YES] / NO |
| EXTERNAL CONTROL SW | [YES] / NO |

| CAMERA 2 | |
|---|---|
| (INFORMATION INHERENT TO DEVICE) | |
| • PRODUCT INFORMATION | |
| (VENDOR ID / PRODUCT NUMBER) | |
| | |
| (INFORMATION ON CAPABILITES OF DEVICE) | |
| REAL TIME CONTROL FUNCTIONS | |
| PAN | [YES] / NO |
| TILT | [YES] / NO |
| ZOOM | [YES] / NO |
| FOCUS | [YES] / NO |
| EXTERNAL CONTROL SW | [YES] / NO |

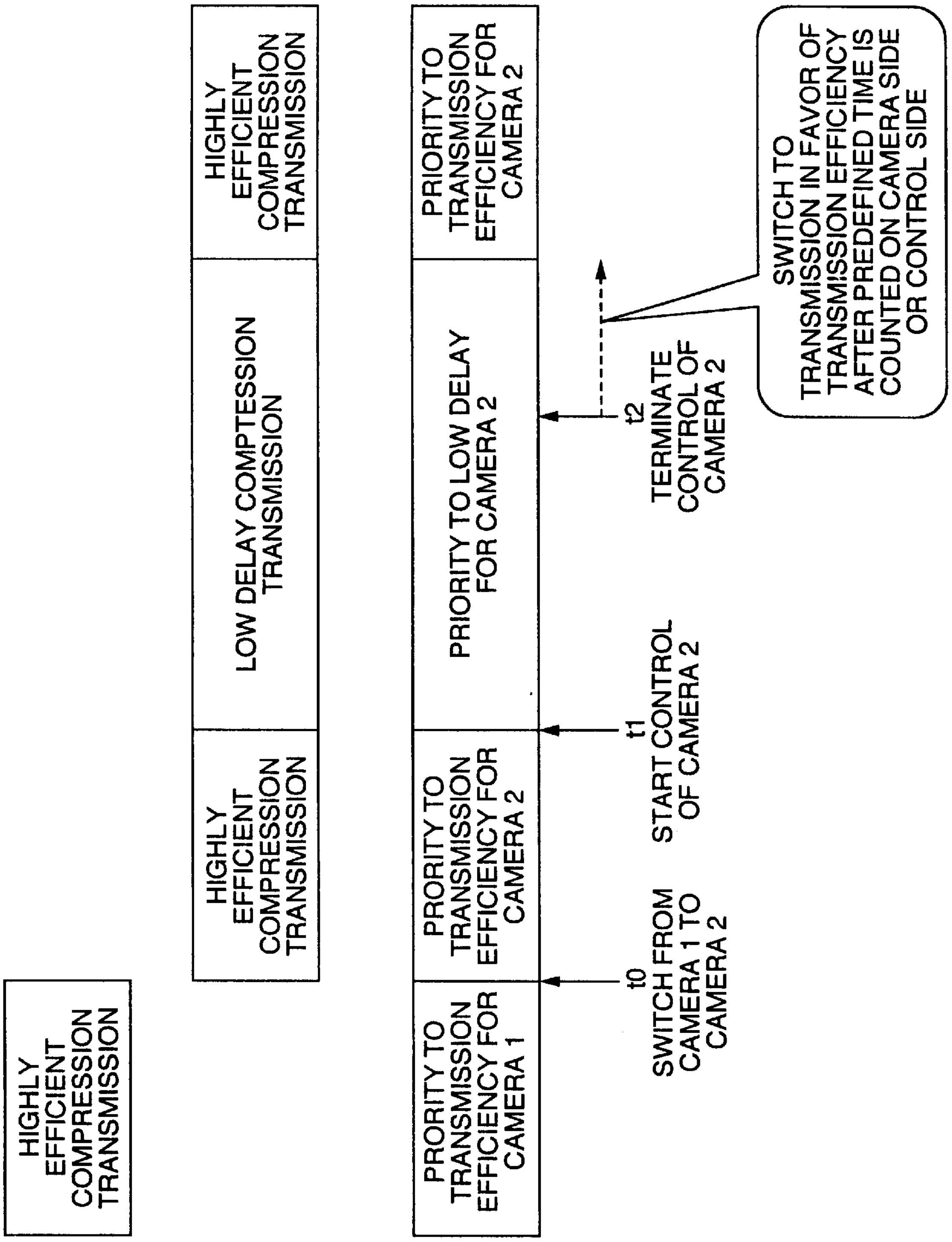
FIG. 8A STREAM FROM CAMERA 1
FIG. 8B STREAM FROM CAMERA 2
FIG. 8C OUTPUT IMAGE

FRAME SWITCHER AND METHOD OF SWITCHING, DIGITAL CAMERA, AND MONITORING SYSTEM

BACKGROUND OF THE INVENTION

The present invention relates generally to a system for transmitting compress-encoded image data, and more particularly to an image data transmission method which reduces a delay due to compress encoding.

Systems which compress encode image data and transmit the encoded data through a network have been brought into practice such as a television telephone system, a teleconference system, a monitoring system, and so on. Such systems employ encoding schemes such as ITU-T, H.261, MPEG (Moving Picture Experts Group), or the like to enable highly defined image information to be transmitted within a narrower transmission bandwidth.

In a system which utilizes inter-frame information to compress image data as does MPEG, and transmits the compressed image data, a transmission delay generally occurs during the compression processing on the order of 150 to 500 ms except for a delay on the network.

Thus, the above-mentioned system has a problem in that, for example, when a mechanical system is controlled to perform panning/tilting, zooming, focusing and so on of a television camera on the transmission side of image data while produced image data is being viewed on a monitor on the reception side, a longer delay time intervenes until an image is displayed on the monitor in response to an inputted control instruction. Particularly, since the control of the television camera for panning/tilting involves controlling the rotation of a rotating pedestal, this exaggerates the problem of long delay time.

In a system which transmits a plurality of pictures as one GOP (Group of Pictures) like MPEG, on the other hand, when a stream of image data is switched among a plurality of image sources, a problem exists in that a switching delay occurs for a time period corresponding to the number of pictures comprising the GOP at maximum.

SUMMARY OF THE INVENTION

The present invention has been made to solve the problems as mentioned above, and it is an object of the present invention to provide an image data transmission method which is capable of reducing a delay associated with the compression processing of image data.

It is another object of the present invention to provide an image data transmission method which is capable of reducing a switching delay possibly caused by switching streams of image data having the GOP structure.

An image data transmission method according to one aspect of the present invention is applied for use with an image data transmission system which comprises a plurality of image data transmission apparatus for compress encoding image data and transmitting compress-encoded image data, an image data reception apparatus for receiving the image data, control device for controlling the image data transmission apparatus, and a network for interconnecting the respective apparatuses. When the image data transmission apparatus is controlled by the control device, the control device acquires information on capabilities of the plurality of image data transmission apparatuses. When the control device determines based on the information on capabilities that a controlled image data transmission apparatus has a function which is affected by a delay due to the compress encoding, or when the controlled image data transmission apparatus uses a function which is affected by the delay due to the compress encoding from among the functions, the image data transmission apparatus is controlled to perform compress encoding that reduces the delay. With this configuration, when the image data transmission apparatus is controlled to operate mechanical systems, for example, while viewing a monitor of the image data reception apparatus, it is possible to reduce a delay time which intervenes until an image responsive to an inputted control instruction is displayed on the monitor.

Also, an image data transmission method according to another aspect of the present invention is applied for use with an image data transmission system which comprises a plurality of image data transmission apparatuses for converting image data to a compress encoded stream having a GOP structure and transmitting the compress-encoded stream, an image data reception apparatus for receiving the stream, a selector for selecting one from the image data transmission apparatus, and a network for interconnecting the respective apparatuses. When the selector switches from an arbitrary image data transmission apparatus to another image data transmission apparatus, the GOP structure is changed for a predetermined time period immediately after the switching to reduce a delay caused by the switching. With this configuration, it is possible to reduce a switching delay time which may occur when a plurality of image data streams are switched among the image data transmission apparatuses.

BRIEF DESCRIPTION OF THE DRAWINGS

FIG. 3 shows an example of information stored in a storage unit of a camera shown in FIG. 1.

FIGS. 4A and 4B show examples of information stored in respective storage units of a control device and a decoder in FIG. 1.

FIGS. 8A to 8C are timing charts representing the control for selecting a camera 2 in a state in which a camera 1 has been selected in FIG. 1.

DESCRIPTION OF THE EMBODIMENTS

Embodiments of the present invention will hereinafter be described in detail with reference to FIGS. 1 to 15.

Figure 1:
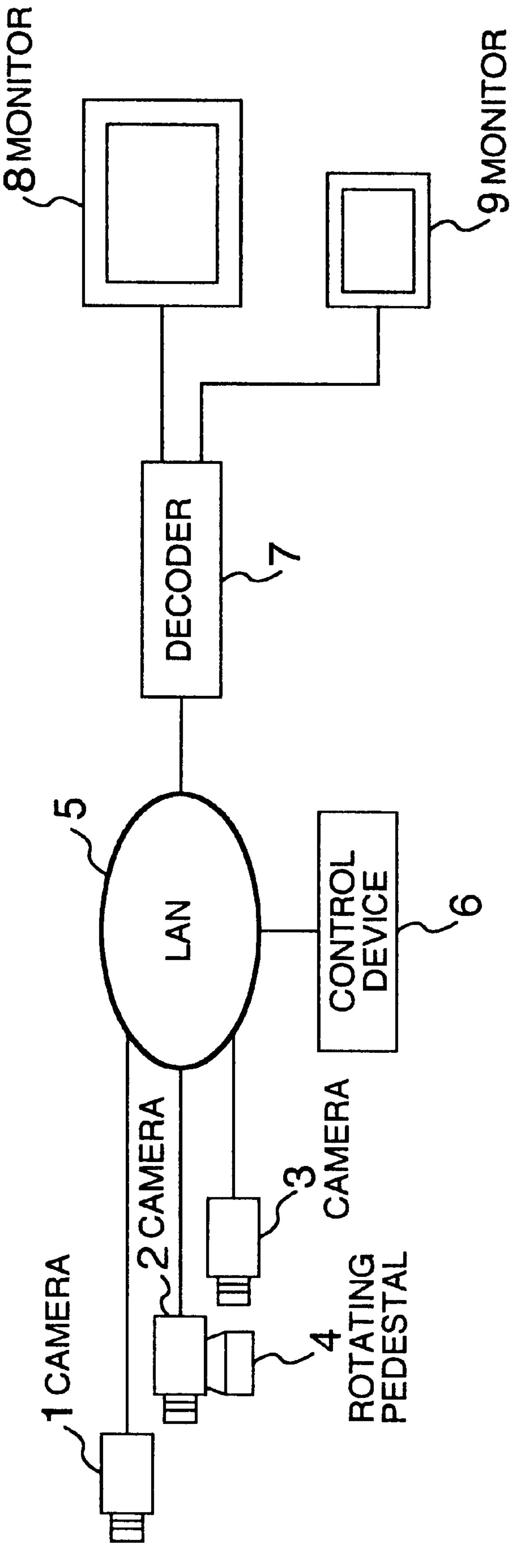
FIG. 1 generally illustrates the configuration of an image data transmission system according to an embodiment of the present invention.

[1] Overview on Configuration and Operation of Image Data Transmission System FIG. 1 illustrates the configuration of an image data transmission system according to an embodiment of the present invention. The image data transmission system comprises a plurality (three in the figure) of television cameras (hereinafter also referred to as "cameras") 1, 2, 3; a control device 6; a decoder 7; a plurality (two in the figure) of monitors 8, 9; and LAN (Local Area Network) 5.

Each of the cameras 1, 2, 3 compresses imaged data in accordance with MPEG2 or the like and sends the compressed image data to the LAN 5. The television camera 2 has a rotating pedestal 4. The LAN 5 is a network which interconnects respective devices through a bus, for example, conforming to IEEE1394 (hereinafter referred to as "1394 bus"). The control device 6, which may be implemented, for example, by a personal computer or a remote commander, transmits commands to the cameras 1, 2, 3 through the LAN 5 to conduct the control or the like for the cameras 1, 2, 3. The decoder 7 decodes image data received through the LAN 5. The monitors 8, 9 display image data decoded by the decoder 7 in different sizes, respectively.

Figure 2:
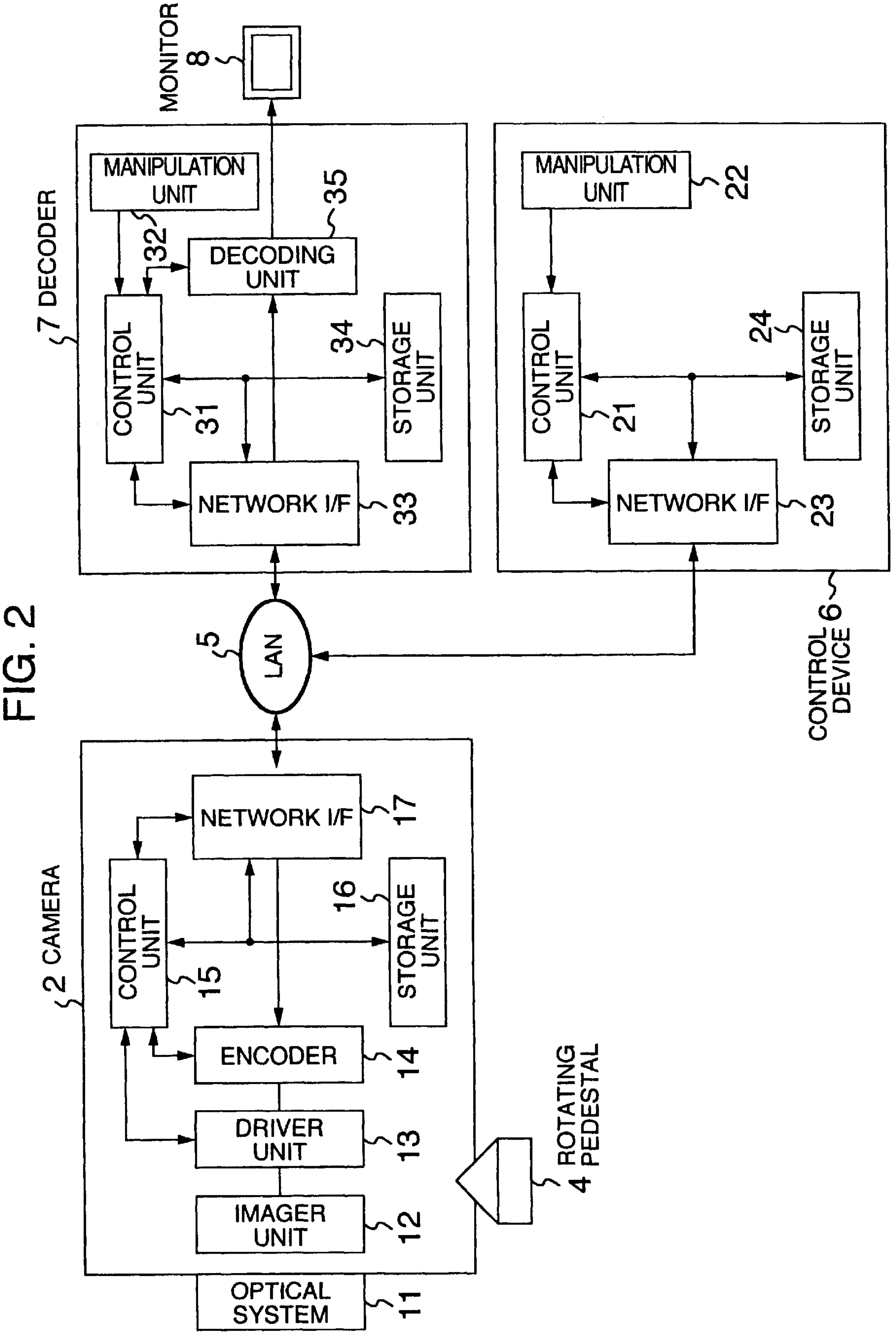
FIG. 2 is a block diagram illustrating the internal configuration of respective devices which constitute the image data transmission system of FIG. 1.

FIG. 2 illustrates internal blocks of the respective devices which constitute the image data transmission system shown in FIG. 1. Since the respective cameras have the same configuration, one camera 2 is only illustrated in FIG. 2. Likewise, as to the monitors, one monitor 8 is only illustrated.

The camera 2 includes an optical system 11; an imager unit 12 for capturing an image of an object focused by the optical system 11; a driver unit 13 for driving the imager unit 12; and an encoder 14 for applying image data compression processing such as MPEG 2 or the like to an imaged output driven by the driver unit 13.

The camera 2 also, includes a control unit 15 for performing control for respective components in the camera 2; a storage unit 16 for storing a variety of information; and a network interface 17. The control unit 15, which is composed of a CPU, a DSP and logical circuits, performs generation, determination of control information, for example, communicated with the external control device 6 through the LAN 5. The control unit 15 also controls parameters associated with the encoder 14, and registers for switching the operation of the network interface 17. Thus, the control unit 15 is implemented with a protocol higher than a link layer of IEEE1394. The storage unit 16 previously stores information on the capabilities of cameras, such as whether or not each camera has a rotating pedestal 4, and information inherent to cameras such as product numbers. The contents stored in the storage unit 16 may be directly read through a DMA from the network interface 17. The network interface 17 has a network interface function such as a physical layer and a link layer of IEEE1394, for example, and exchanges information with the control unit 15 and the storage unit 16 as well as inputs and outputs an image data stream which is the output of the encoder 14.

The control device 6 comprises a control unit 21, a manipulation unit 22, a network interface 23 and a storage unit 24. The control unit 21, which may comprise a CPU, controls the network interface 17. More specifically, the control unit 21 performs generation, determination of control information, for example, communicated with the external control device 6 through the LAN 5. The control unit 21 is also implemented with software for managing and controlling the configurations and capabilities of respective devices (cameras, decoder) connected to the LAN 5, and information on the topology of the network (connection configuration) The manipulation unit 22 may be a keyboard, a mouse provided for the user to input a variety of instructions to the control unit 22. The network interface 23 has a network interface function such as a physical layer and a link layer of IEEE1394, for example, for exchanging information with the control unit 21 and the storage unit 24. The storage unit 24 stores the configurations and capabilities of respective devices connected to the LAN 5, the information on topology of the network. The contents stored in the storage unit 24 may be directly read through a DAM from the network interface 23. In addition, the control device 6 may be provided with a display unit comprising LCD.

The decoder 7 comprises a control unit 31 for performing control for respective components of the decoder 7; a manipulation unit 32; a network interface 33; a storage unit 34 for storing a variety of information; and a decoder 35. The control unit 31, which composes a CPU, a DSP and logical circuits, performs generation, determination of control information, for example, communicated with the external camera 2 through the LAN 5. The control unit 31 also controls parameters associated with the decoder 35, and registers for switching the operation of the network interface 33. In addition, the control unit 31 is implemented with a protocol higher than a link layer of IEEE1394. The control unit 31 may be additionally implemented with software for managing and controlling the configurations and capabilities of respective devices connected to the LAN 5 and information on the topology of the network. The manipulation unit 32 may be a keyboard, a mouse provided for the user to input a variety of instructions. The network interface 33 has a network interface function such as a physical layer and a link layer of IEEE1394, for example, for exchanging information with the control unit 31 and the storage unit 34, for inputting and outputting an image data stream produced by the camera 2, inputted from the LAN 5, for transmitting a synchronization packet (cycle start packet for a 1394 bus). It should be noted that while the decoder 7 sends the synchronization packet in this embodiment, one of the network interfaces 17, 23 of the camera 2 and the control device 6 may serve as a cycle master to transmit the cycle start packet when a cycle master determining approach defined in IEEE1394 is utilized. The storage unit 34 stores the type of decodable compression scheme, the size of a connected monitor, the capabilities of the decoder 7 such as the size of available image for display, and information inherent to the decoder 7 such as the product number. The contents stored in the storage unit 34 may be directly read through a DMA from the network interface 33. The decoder 35 decodes a stream received through the network interface 33 and outputs the decoded stream to the monitor 8.

FIG. 3 shows an example of information stored in the storage unit 16 of the camera 2. The storage unit 16 stores a vendor ID and a product number as the information inherent to the camera 2, and the presence or absence of a real time control function (panning, tilting, zooming, focusing, external control switching) as the information on the capabilities of the device. The storage unit 16 may be a non-volatile memory such as a flash ROM.

FIGS. 4A and 4B show examples of information stored in the storage unit 24 of the control unit 6 and in the storage unit 34 of the decoder 7, respectively. The storage units 24, 34 each store, as information on the camera 1, a vendor ID and a product number, which are information inherent to the camera 1, and the presence or absence of a real time control function (panning, tilting, zooming, focusing, external control switching) as information on the capabilities. Similarly, the storage units 24, 34 each store, as information on the camera 2, a vendor ID and a product number, which are information inherent to the camera 2, and the presence or absence of a real time control function (panning, tilting, zooming, focusing, external control switching) as information on the capabilities. The storage units 24, 34 comprise DRAM, and store the variety of information as mentioned which is taken in through the LAN 5 upon power on, a change in network configuration, bus reset or selection of a camera.

The operation of the image data transmission system illustrated in FIG. 1 will be described in outline. The user may select an arbitrary camera from the cameras 1, 2, 3 using the manipulation unit 22 of the control device 6. An image of a selected camera is sent to the decoder 7 through the LAN 5, decoded by the decoder 7, and displayed on the monitors 8, 9. In this event, the camera can be controlled in a variety of aspects (panning, tilting, zooming, focusing). Also, the once selected camera may be switched to another camera using the manipulation unit 22 of the control device 6. It should be noted that the foregoing manipulations may be performed using the manipulation unit 32 of the decoder 7.

[2] Transmission Delay Reduction Method

The cameras 1, 2, 3 in the image data transmission system illustrated in FIG. 1 suffer from a transmission delay caused by the compression processing since the image data is compressed before transmission. Also, when a camera is controlled for panning, tilting, zooming, focusing, a delay required to a response of an associated mechanical system is added to the transmission delay due to the compression processing, thereby resulting in a longer delay time which intervenes until an image is displayed on the monitors in response to a control instruction inputted from the control device 6.

Thus, for reducing the delay time, an embodiment of the present invention relies on the following method to reduce the delay time. Specifically, the control device 6 identifies whether or not a camera has a function which may be possibly affected by the delay time, such as panning, tilting, zooming, focusing. When the intended camera has such functions and is actually using any of the functions, the camera is controlled to force the encoder to perform the compression processing that produces a shorter delay time. In the following, this method will be explained in detail.

Figure 5:
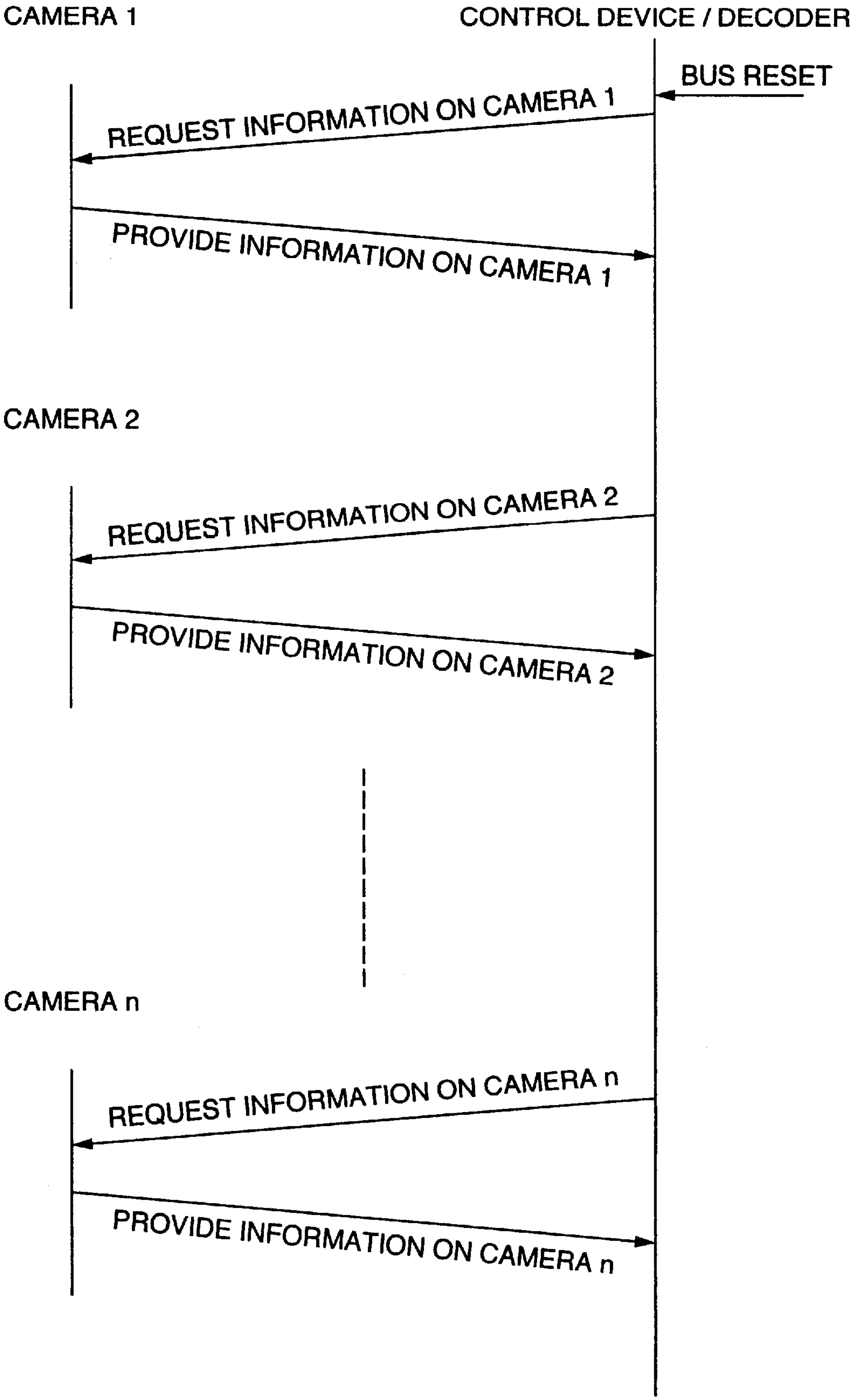
FIG. 5 shows a procedure for the control device and the decoder in FIG. 1 to acquire a function of each camera.

(2-1) Procedure for Acquiring Variety of Information on Camera Referring first to FIG. 5, explanation will be given of a procedure for the control device 6 and the decoder 7 to acquire functions of respective cameras. A bus reset is generated on the 1394 bus connected to the LAN 5 at the time of such events as power-on of the image data transmission system illustrated in FIG. 1, or connection of a device to the system. Then, after a process for identifying the network topology after the bus reset, the control device 6 and the decoder 7 sequentially transmit information request commands to cameras 1, 2, . . . , n, respectively. Upon receipt of the information request command, each camera returns information stored in the storage unit as a response. Taking the camera 2 as an example, since the storage unit 16 stores the information shown in FIG. 3, the camera 2 returns this information. The returned information is stored in the storage unit 24 of the control device 6 and in the storage unit 34 of the decoder 7, respectively, as previously shown in FIGS. 4A and 4B. Similarly, such information on the respective cameras is stored in the storage units 24, 34 of the control unit 6 and the decoder 7, respectively.

The execution of this procedure enables the control device 6 and the decoder 7 to know the information on the capabilities of the respective cameras. The information on the capabilities may be displayed when the user selects a camera.

Figure 6:
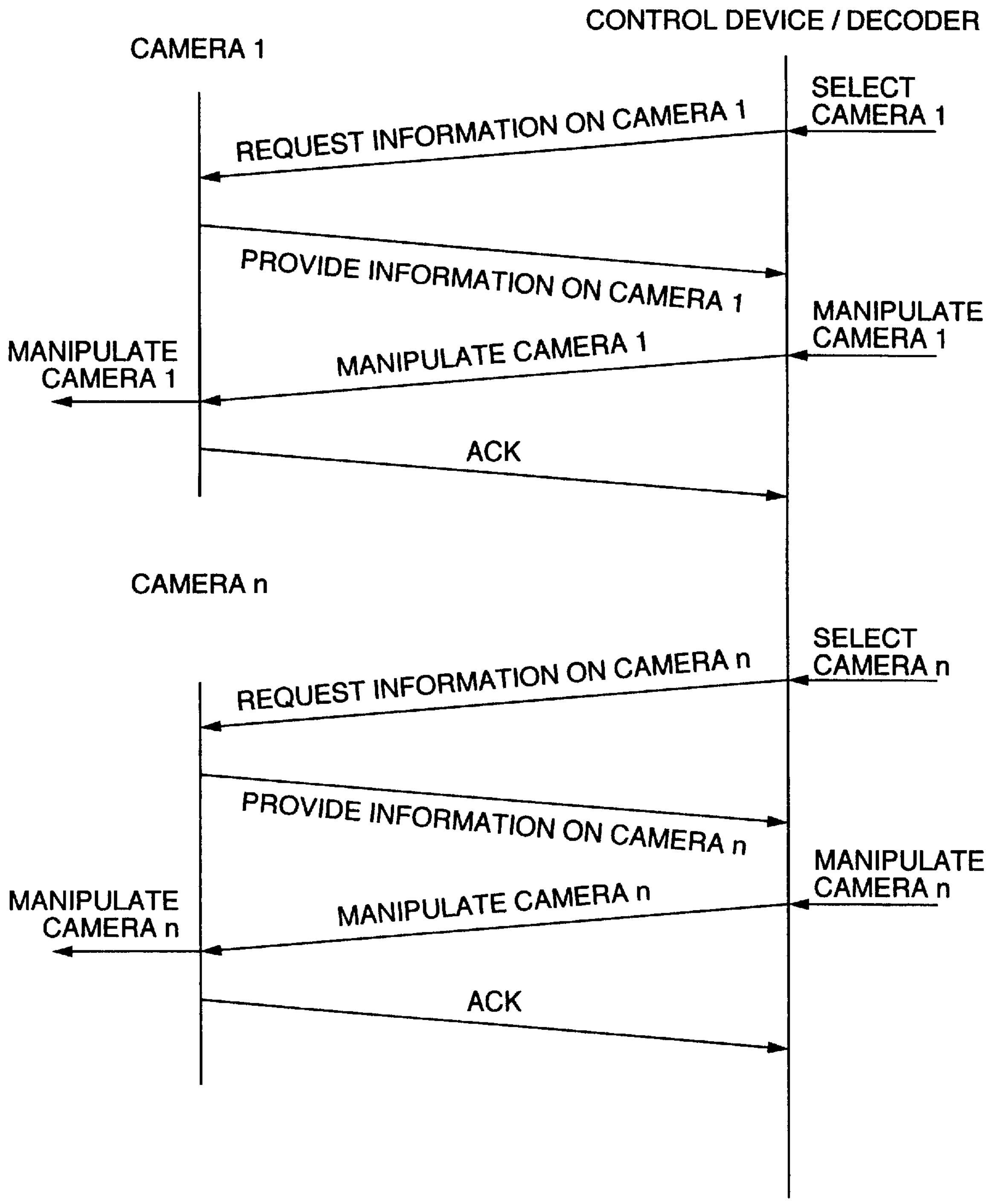
FIG. 6 shows a procedure for the control device and the decoder in FIG. 1 to select and operate each camera.

Alternatively, the information on each camera may be acquired at the time the camera is selected. FIG. 6 illustrates a procedure for this alternative. In this procedure, as the control device 6 or the decoder 7 has selected a camera, an information request command is transmitted to the selected camera. Upon receipt of the information request command, the selected camera returns information stored in the storage unit as a response. Subsequently, the user may manipulate the selected camera.

(2-2) Processing Involved in Selection and Manipulation of Camera

Figure 7:
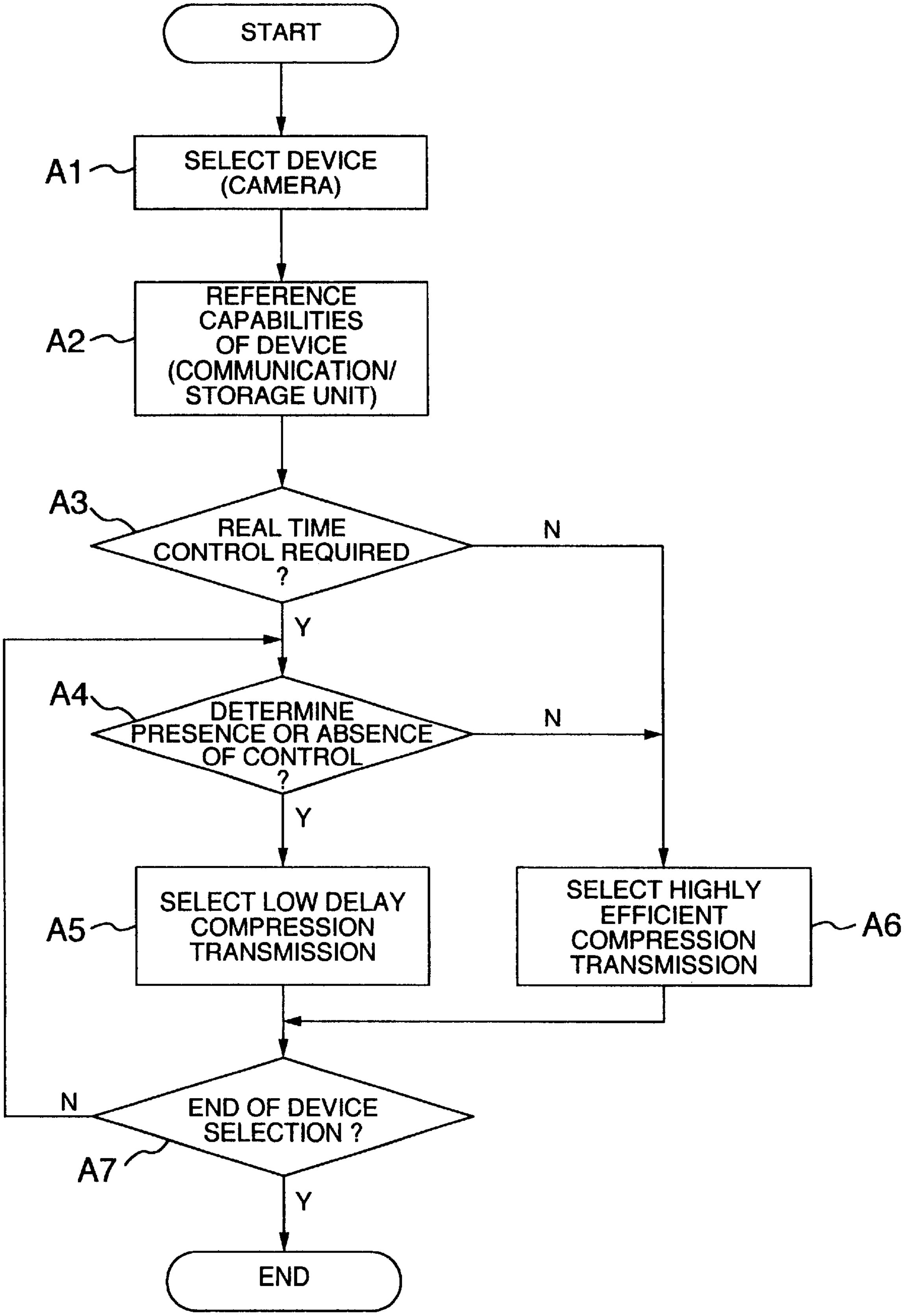
FIG. 7 is a flowchart illustrating the operation of the control device in FIG. 1 for selecting and controlling a camera.

Referring to FIG. 7, explanation will be given of the operation of the image data transmission system illustrated in FIG. 1, when an arbitrary camera is selected and manipulated While the selection and manipulation of a camera can be performed from either the control device 6 or the decoder 7, as previously described, the following explanation will proceed on the assumption that the control devices is used for the selection and manipulation.

First, as shown in step A1, the user uses the manipulation unit 22 of the control device 6 to give an instruction to select an arbitrary camera. As the instruction is inputted, the control unit 21 of the control device 6 references the information on the capabilities of a selected camera, as shown in step A2. Specifically, the control unit 21 acquires the information on the capabilities upon bus reset in accordance with the procedure illustrated in FIG. 5. When the information is previously stored in the storage unit 24, the control unit 21 references the stored information. On the other hand, for acquiring the information on the capabilities of a camera in accordance with the procedure illustrated in FIG. 6, i.e., upon selection of the camera, the control unit 21 transmits a camera information request command at this time, and stores the information on the capabilities within a returned response in the storage unit 24.

As shown in step A3, the control unit 21 examines a camera control instruction inputted by the user to determine whether or not the control instruction requires a real time control. The real time control refers to panning, tilting, zooming, focusing, as shown in FIG. 3 and FIGS. 4A, 4B. When no real time control is required (No at step A3), the procedure proceeds to step A6, where the control unit 21 selects the compression processing that enables highly efficient transmission. Specifically, the control unit 21 of the control device 6 transmits through the network interface 23 and the LAN 5 a command for instructing the selected camera to select the compression processing that enables the highly efficient transmission. This command is inputted to the control unit 15 of the selected camera, for example, the camera 2, through the network interface 17. Then, the control unit 15 interprets the command to select the compression processing for the encoder 14 in accordance with the interpretation. The compression processing that enables the highly efficient transmission will be described later in detail.

Conversely, when Yes at step A3, the procedure proceeds to step A4, where the control unit 21 determines the presence or absence of the real time control. When the control unit 21 determines that the real time control is instructed, the procedure proceeds to step A5, where the control unit 21 selects compression processing that enables a low delay (short delay time) transmission. The compression processing that enables a low delay transmission will be described later in detail. When the control unit 21 determines at step A4 that there is no real time control for a predefined time period, the procedure proceeds to step A6 where the control unit 21 selects the compression processing that enables a highly efficient transmission. Then, the processing at step A4 onward is repeated until the selection of a camera is terminated at step A1 (step A7). Alternatively, the camera itself may determine whether or not there is the real time control for a predefined time period such that the camera itself selects the appropriate compression processing. Also, after the device capabilities are referenced at step A2, the control unit 21 may determine whether or not the selected camera has a rotating pedestal from the presence or absence of panning/tilting functions, and selects the compression processing that enables a low delay (short delay time) transmission irrespective of the presence or absence of the real time control, when the selected camera has a rotating pedestal. Subsequently, the control unit 21 may switch to the compression processing that enables a highly efficient transmission when it determines that no real time control has been instructed for the predefined time period.

FIGS. 8A to 8C are timing charts representing a control performed for selecting the camera 2 when the camera 1 is selected. As illustrated in these timing charts, the camera 2 is selected at time t0 from a state where the camera 1 is selected but not controlled. From time t1, a real time control is started for the camera 1, and subsequently, the control is terminated at time t2. In this event, since no real time control is performed from time t0 to t1, the camera 2 transmits a highly efficiently compressed image which is displayed on the monitor 8. Further, since the real time control is performed from time t1 to t2, the camera 2 transmits a low delay compressed image which is displayed on the monitor 8. Then, the camera 2 transmits a highly efficiently compressed image which is displayed on the monitor 8 after the lapse of a predefined time period from time t2 at which the control is terminated.

Figure 9A:
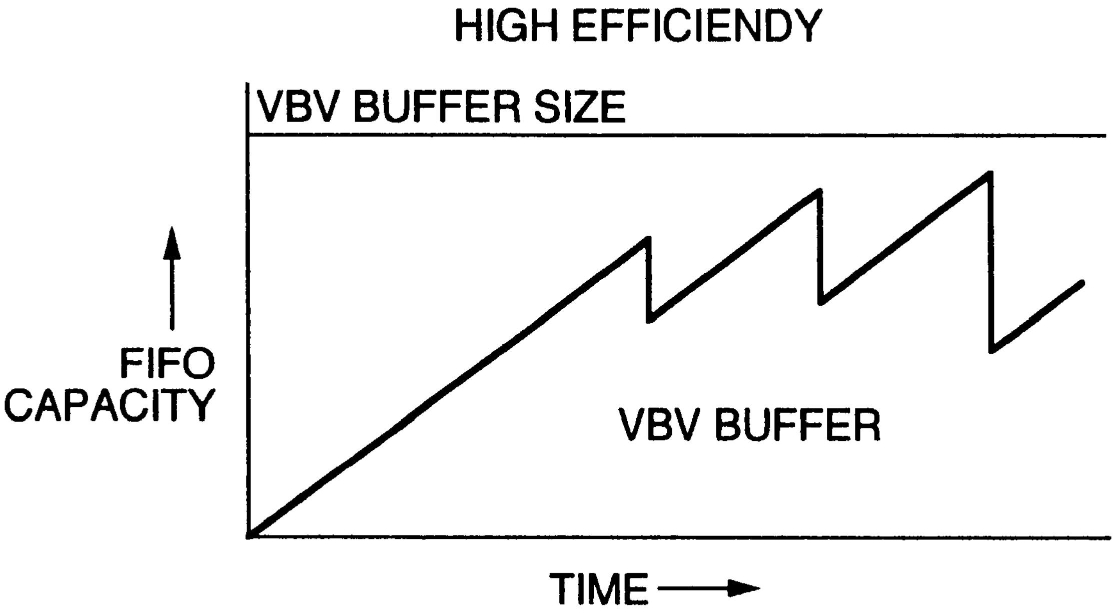
FIGS. 9A and 9B are graphs for explaining a first example of highly efficient compression processing and low delay compression processing in an embodiment of the present invention.
Figure 9B:
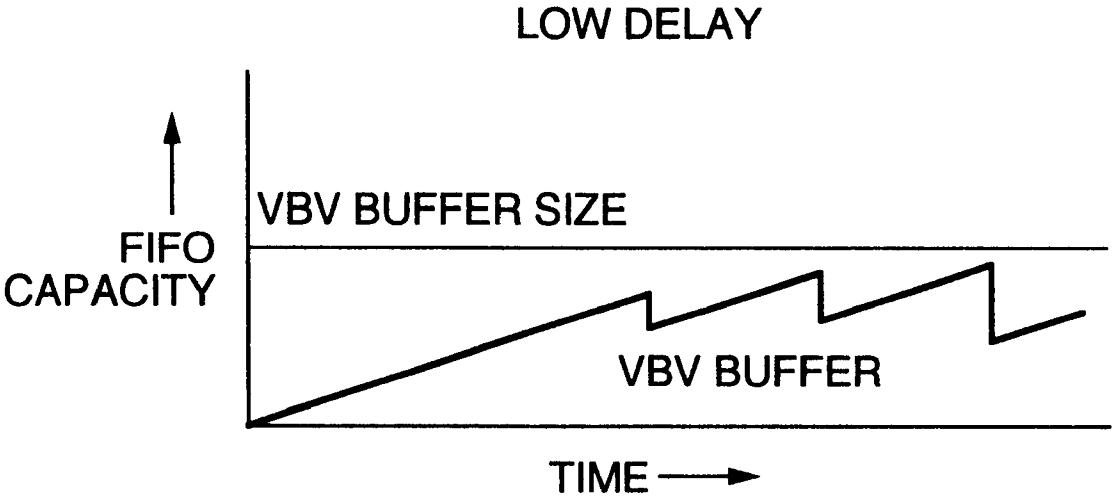

(2-3) Highly Efficient Compression Processing and Low Delay Compression Processing Two examples will be explained for the highly efficient compression processing and the low delay compression processing. FIGS. 9A and 9B are graphs for explaining a first example, whereas FIGS. 10A to 10D are diagrams for explaining a second example.

The first example will be first explained. A method according to the first example changes the size of a VBV buffer including FIFO memories of the encoder within the camera to enable the switching between the highly efficient compression processing and the low delay compression processing. More specifically, as illustrated in FIG. 9A, as the VBV has a lager size, the delay time becomes longer and the compression efficiency becomes higher. Conversely, as illustrated in FIG. 9B, as the VBV buffer has a smaller size, the delay time becomes shorter and the compression efficiency becomes lower.

Figure 10A:
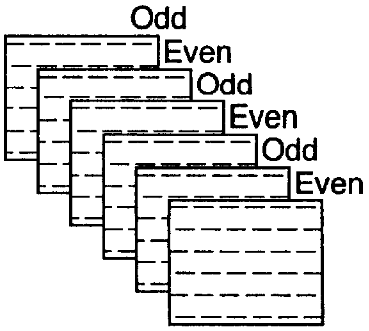
FIGS. 10A to 10D are diagrams for explaining a second example of highly efficient compression processing and low delay compression processing in an embodiment of the present invention.
Figure 10B:
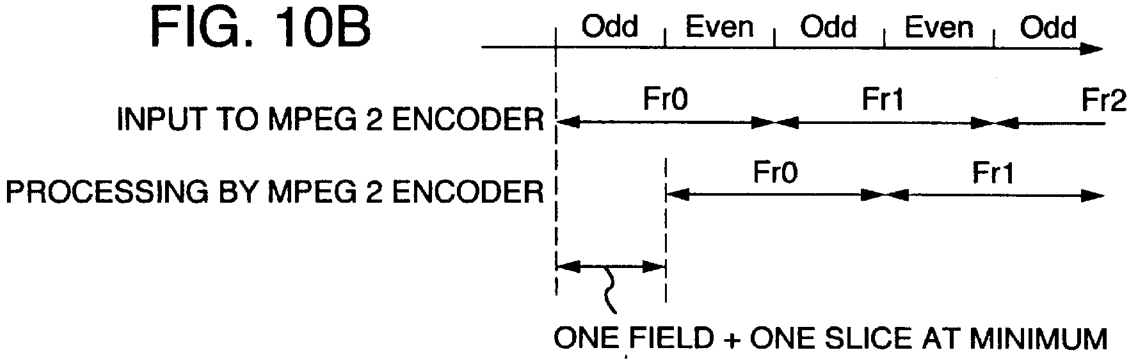
Figure 10C:
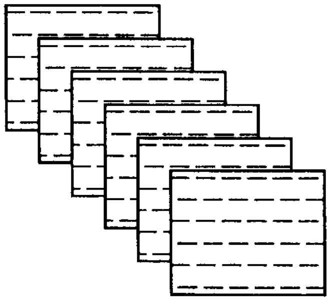
Figure 10D:
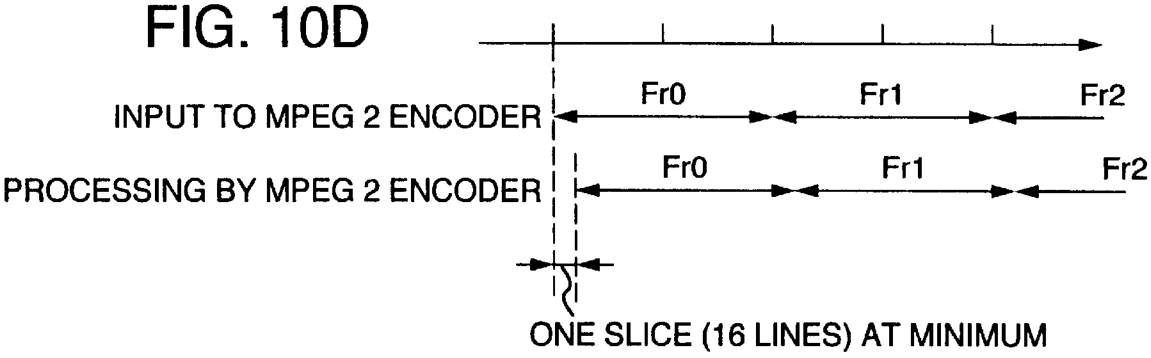
Figures 11A, 11B, 11C, 11D, 11E:
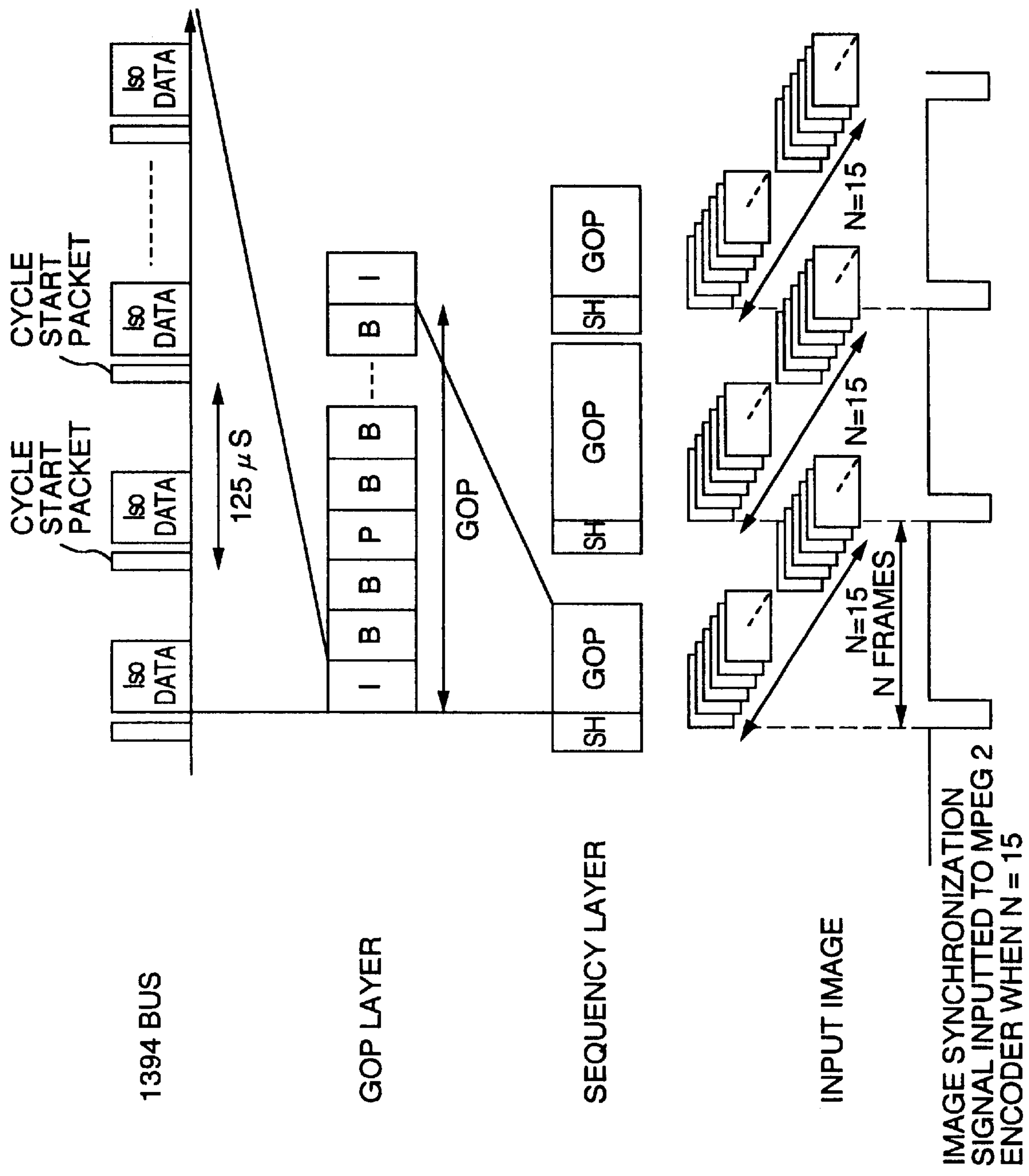
FIGS. 11A to 11E are diagrams for explaining the GOP synchronization in an embodiment of the present invention.

A method according to the second example switches the structure of the MPEG encoding to enable the switching between the highly efficient compression processing and the low delay compression processing. More specifically, as illustrated in FIGS. 10A and 10B, since a frame structure, when employed, causes a delay of one field plus one slice at minimum, the delay time becomes longer and the compression efficiency becomes higher. Conversely, as illustrated in FIGS. 10C and 10D, since a field structure, when employed, causes a delay of only one slice at minimum, the delay time becomes shorter and the compression efficiency becomes lower.

As described above, according to this embodiment of the present invention, when a camera uses a function which may be affected by a delay time, such as panning, tilting, zooming, focusing, the encoder in the camera performs the compression processing that produces a shorter delay time to reduce the delay time.

[3] Camera Switching Delay Reduction Method

The cameras 1–3 shown in FIG. 1 employ MPEG2 to compress data, and transmit image data in units of GOP which is comprised of a plurality of pictures (for example, 15 pictures). In an example shown in FIG. 11, each of the cameras fetches a cycle start packet broadcast on the network by a device (decoder 7 in FIG. 1) which serves as a cycle master on the 1394 bus. Then, each of the cameras uses the packet to establish the GOP synchronization, and inputs image data of the camera into the encoder. For this reason, a switching from one camera to another results in a switching delay which lasts for a time period corresponding to the number of pictures constituting the GOP at maximum.

Thus, an embodiment of the present invention relies on the following method to reduce the switching delay time. Specifically, the GOP structure is changed for a predetermined time period immediately after switching a camera to another. In the following, explanation will be given of two examples for changing the GOP structure.

(3-1) First Method

In a first method, a counter is provided for counting the number of pictures being transmitted for each GOP so as to transmit, until the next GOP synchronization, a particular GOP which has the number of pictures equal to the value calculated by subtracting a count value on the counter immediately after the switching of a camera from the number of pictures in the normal GOP.

Figures 12A, 12B, 12C:
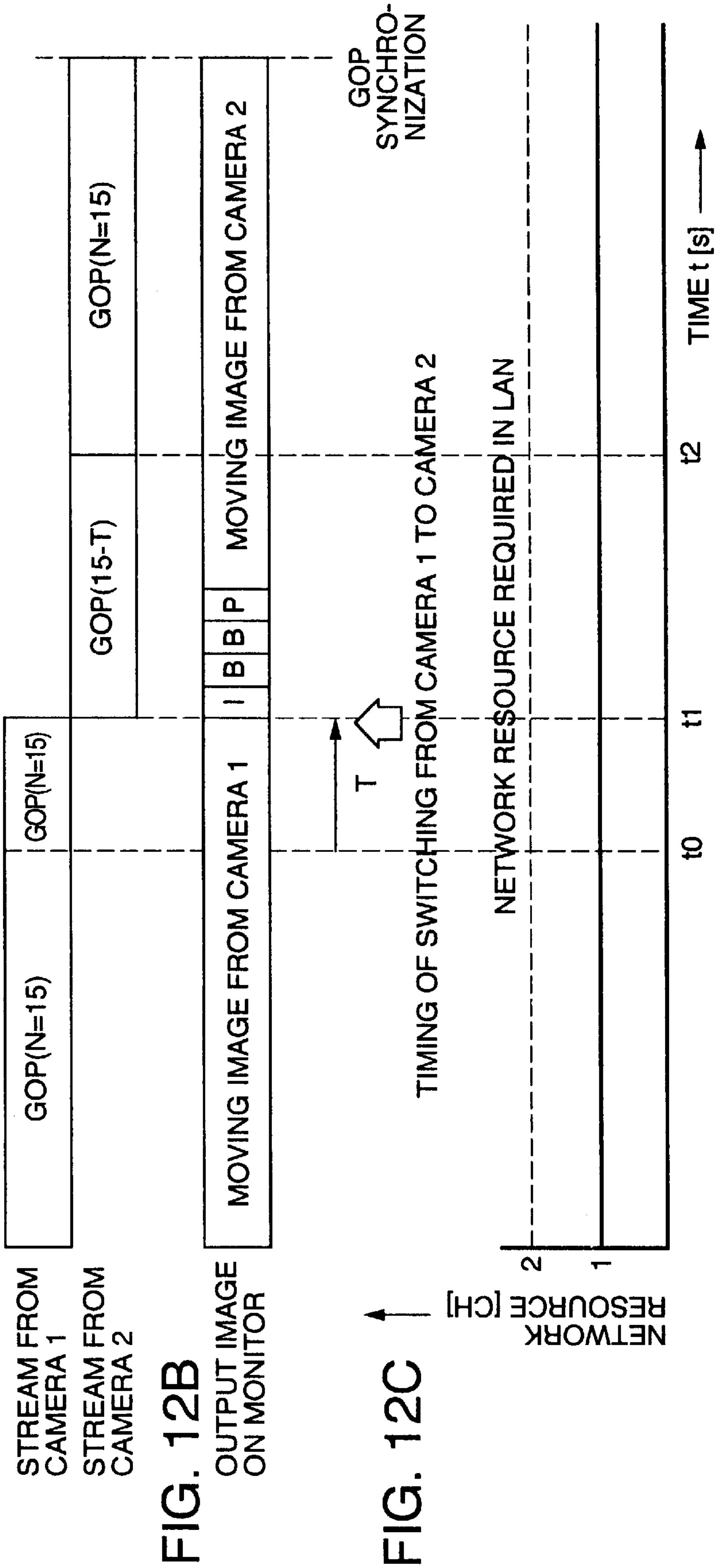
FIGS. 12A to 12C are timing charts for explaining a first exemplary method of reducing a camera switching delay in an embodiment of the present invention.
Figure 13:
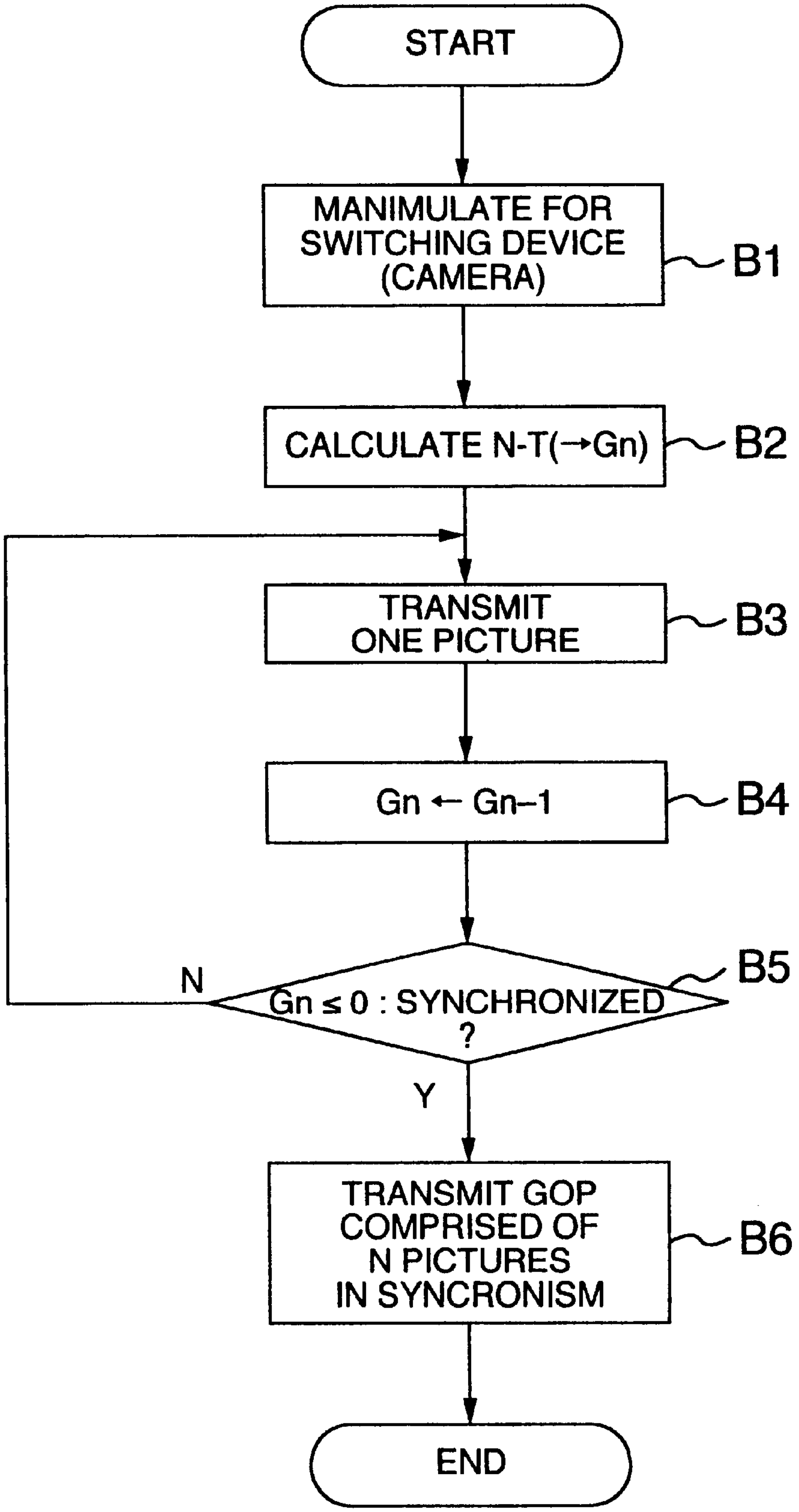
FIG. 13 is a flowchart illustrating the first exemplary method of reducing a camera switching delay in the embodiment of the present invention.

FIGS. 12A to 12C show timing charts associated with the operation of the first method, and a required network resource capacity, and FIG. 13 illustrates the first method in flow chart form. Assume that in each camera, one GOP comprises 15 pictures consisting of I, B, B, P, B, B, P, B, B, P, B, B, P, B, B.

First, as shown in FIGS. 12A to 12C, assume that a stream from the camera 1 is transmitted and displayed on the monitor 8 or 9 in FIG. 1. Assume also that an instruction for switching from the camera 1 to the camera 2 is inputted to the control unit 15 of the camera 2 at time t1 which is after the lapse of a time period T from the timing of GOP synchronization at time t0 (at step B1 in FIG. 13). In the control unit 15, the GOP counter is counting pictures to see at which position a currently transmitted picture is located from the head in each GOP. Then, the GOP counter outputs a count value Gn at that time (step B2).

After transmitting one picture (step B3), the count value Gn is decremented by one (step B4). The foregoing processing is repeated until the count value Gn is counted down to zero or less (step B5). Then, as the count value Gn shows zero or less, in other words, when the next timing of GOP synchronization is reached, the GOP comprising 15 pictures is transmitted (step B6).

In this way, during a period from time t1 to t2 in FIGS. 12A to 12C, the camera 2 transmits a number of pictures equal to the value calculated by subtracting the number of pictures transmitted during a time period T from 15, and as the next timing of GOP synchronization is reached at time t2, the camera 2 transmits a stream or GOP compriseing 15 pictures, as the camera 1 does before the switching. In this event, the required network resource capacity remains to be one channel portion all the way across the switching.

The foregoing operations are performed on the assumption that the GOP cycles of the cameras 1–3 are synchronized. For a system in which cameras operate out of GOP synchronization, a new GOP cycle may be started from the time when a switching is instructed, which is considered as the origin. Also, even in a system with synchronized cameras, certain offset in GOP cycle may be tolerated immediately after the switching, such that the synchronization is gradually recovered. Specifically, assuming that one GOP comprises 15 pictures, and a switching is instructed at the ninth picture within the GOP, the GOP synchronization may not be recovered after a GOP comprised of six pictures is delivered immediately after the switching, but instead the synchronization may be recovered, for example, after GOP's comprising 12 pictures are delivered three times. Further, such a special GOP may not be smaller than the normal GOP. For example, when a switching is instructed at the ninth picture within one GOP, a GOP comprising 21 pictures may be delivered to recover the synchronization after skipping once the GOP synchronization.

(3-2) Second Method

The second method involves the transmission of only I pictures from immediately after a switching from a camera to another to the next GOP synchronization.

Figures 14A, 14B, 14C:
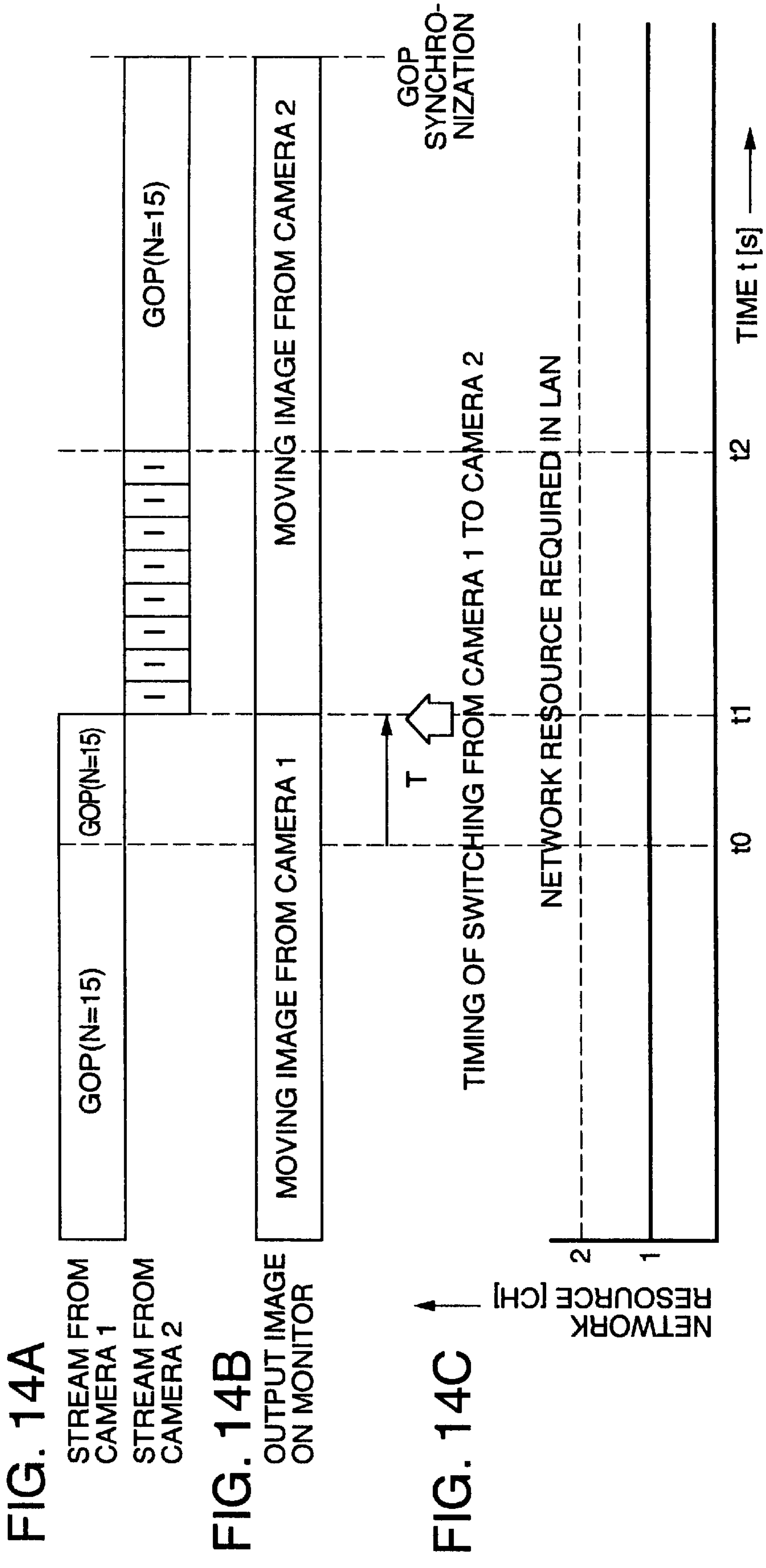
FIGS. 14A to 14C are timing charts for explaining a second exemplary method of reducing a camera switching delay in the embodiment of the present invention.
Figure 15:
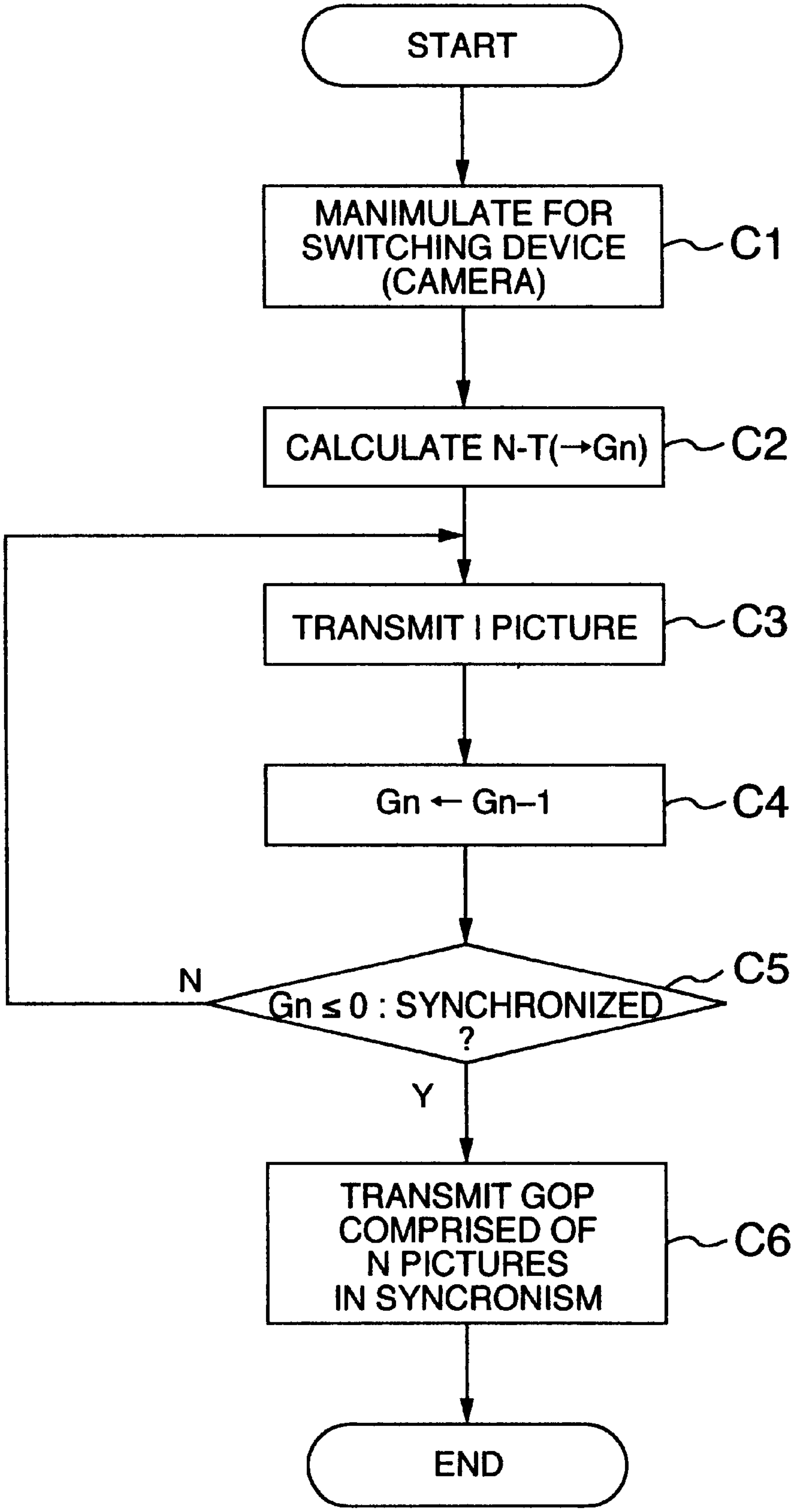
FIG. 15 is a flow chart illustrating the second exemplary method of reducing a camera switching delay in the embodiment of the present invention.

FIGS. 14A to 14C show timing charts associated with the operation of the second method, and a required network resource capacity, and FIG. 15 illustrates the second method in flow chart form. Similar to the first method, assume that in each camera, one GOP comprises 15 pictures consisting of I, B, B, P, B, B, P, B, B, P, B, B, P, B, B.

First, as shown in FIGS. 14A to 14C, assume that a stream from the camera 1 is transmitted and displayed on the monitor 8 or 9 in FIG. 1. Assume also that an instruction for switching from the camera 1 to the camera 2 is inputted to the control unit 15 of the camera 2 at time t1 which is after the lapse of a time period T from the timing of GOP synchronization at time t0 (at step C1 in FIG. 15). In the control unit 15, the GOP counter is counting pictures to see at which position a currently transmitted picture is located from the head in each GOP. Then, the GOP counter outputs a count value Gn at that time (step C2).

After transmitting an I picture (step C3), the count value Gn is decremented by one (step C4). The foregoing processing is repeated until the count value Gn is counted down to zero or less (step C5). Then, as the count value Gn shows zero or less, in other words, when the next timing of GOP synchronization is reached, the GOP comprising 15 pictures is transmitted (step C6).

In this way, that camera 2 transmits only I pictures during a period from time t1 to t2 in FIGS. 14A to FIG. 14C. At time t2 at which the timing of the next GOP synchronization is reached, the camera 2 transmits a stream comprising 15 pictures consisting of I, B, B, P, B, B, P, B, B, P, B, B, P, B, B as the camera 1 does before the switching. In this event, the required network resource capacity remains to be one channel portion all the way across the switching.

The foregoing operations are performed on the assumption that the GOP cycles of the cameras 1–3 are synchronized, and the GOP synchronization is relied on as a condition for determining whether or not the transmission of only I pictures is terminated. Alternatively, it is contemplated that the transmission of only I pictures should be terminated on other conditions, i.e., when a preset constant time period elapses, when an analysis on a video image shows a change in the video image equal to or less than a threshold value, when a termination instruction is issued, when the traffic monitored on the network presents a change, and when the amount of traffic exceeds a threshold value.

As described above, according to this embodiment of the present invention, the switching delay can be reduced by changing the structure of the GOP for a predetermined time period from immediately after the switching of a camera.

According to the present invention as described above in detail, when an image data transmission apparatus is controlled by the control device, the control device acquires information on capabilities of the image data transmission apparatus. When the control device determines based on the information on capabilities that a controlled image data transmission apparatus has a function which is affected by a delay due to the compress encoding, or when the controlled image data transmission apparatus uses a function which is affected by the delay due to the compress encoding from among the functions, the image data transmission apparatus is controlled to perform the compress encoding that reduces the delay. It is therefore possible to provide an image data transmission method which has a significant advantage of reducing a delay time which intervenes until an image responsive to an inputted control instruction is displayed on the monitor, for example, when the image data transmission apparatus is controlled to operate the mechanical systems while the monitor is being viewed on the image data reception apparatus.

Also, according to the present invention, when the selector switches from an arbitrary image data transmission apparatus to another image data transmission apparatus, the GOP structure is changed for a predetermined time period immediately after the switching to reduce a delay caused by the switching. It is therefore possible to provide an image data transmission method which has a significant advantage of reducing a switching delay time which may occur when a plurality of image data streams are switched among the image data transmission apparatus.

What is claimed is:

1. An image data transmission method comprising the steps of:

providing a plurality of image data transmission apparatuses for compress-encoding image data and transmitting compress-encoded image data;

providing an image data reception apparatus for receiving said image data;

providing a control device for controlling said image data transmission apparatus;

providing a network for interconnecting said respective apparatuses;

acquiring information on capabilities of said plurality of image data transmission apparatuses when said image data transmission apparatuses are controlled by said control device; and when said control device determines based on said information on capabilities that a controlled image data transmission apparatus has a function which is affected by a delay due to the compress encoding, or when said controlled image data transmission apparatus uses a function which is affected by the delay due to the compress-encoding from among functions thereof, performing compress-encoding which reduces said delay.

2. An image data transmission method according to claim 1, further comprising the step of switching to compress encoding having a high transmission efficiency when any of said image data transmission apparatuses is not controlled for a predefined time period, or when any of said image data transmission apparatuses has no use of a function which is affected by a delay for a predefined time period.

3. An image data transmission method according to claim 1, wherein said control device acquires the information on capabilities through the network when an image data transmission apparatus is selected.

4. An image data transmission method according to claim 2, wherein said control device acquires the information on capabilities through the network when an image data transmission apparatus is selected.

5. An image data transmission method according to claim 1, wherein said control device acquires the information on capabilities through said network and stores the information when said image data transmission apparatus are connected to said network.

6. An image data transmission method according to claim 2, wherein said control device acquires the information on capabilities through said network and stores the information when said image data transmission apparatus are connected to said network.

7. An image data transmission method according to claim 1, wherein said compress encoding which reduces said delay is performed with a reduced capacity of a buffer memory for use in encoding.

8. An image data transmission method according to claim 1, wherein said compress encoding which reduces said delay includes encoding which employs a field structure.

9. An image data transmission method comprising the steps of:

providing a plurality of image data transmission apparatuses for converting image data into a compress-encoded stream having a GOP structure and transmitting said compress-encoded stream;

providing an image data reception apparatus for receiving said stream;

providing a selector for selecting one of said image data transmission apparatuses;

providing a network for interconnecting said respective apparatuses; and when said selector switches from an arbitrary image data transmission apparatus to another image data transmission apparatus, changing the GOP structure for a predetermined time period immediately after the switching to reduce a delay caused by the switching.

10. An image data transmission method according to claim 9, wherein said step of changing the GOP structure includes stopping transmission of a current GOP at the time the switching is instructed, and starting a new GOP cycle.

11. An image data transmission method according to claim 9, further comprising the steps of providing a counter for counting a number of transmitted pictures for each GOP, and transmitting, until the next GOP synchronization, a GOP having a number of pictures equal to a value calculated by subtracting a count value of said counter immediately after the switching from the number of pictures in the GOP.

12. An image transmission method according to claim 9, wherein said step of changing the GOP structure includes transmitting only I pictures for a predetermined time period immediately after the switching.

13. An image data transmission method according to claim 9, wherein said step of changing the GOP structure includes transmitting only I pictures from immediately after the switching to the next GOP synchronization.

14. An image data transmission method according to claim 2, wherein said compress encoding which reduces said delay is performed with a reduced capacity of a buffer memory for use in encoding.

15. An image data transmission method according to claim 3, wherein said compress encoding which reduces said delay is performed with a reduced capacity of a buffer memory for use in encoding.

16. An image data transmission method according to claim 4, wherein said compress encoding which reduces said delay is performed with a reduced capacity of a buffer memory for use in encoding.

17. An image data transmission method according to claim 5, wherein said compress encoding which reduces said delay is performed with a reduced capacity of a buffer memory for use in encoding.

18. An image data transmission method according to claim 6, wherein said compress encoding which reduces said delay is performed with a reduced capacity of a buffer memory for use in encoding.

19. An image data transmission method according to claim 2, wherein said compress encoding which reduces said delay includes encoding which employs a field structure.

20. An image data transmission method according to claim 3, wherein said compress encoding which reduces said delay includes encoding which employs a field structure.

21. An image data transmission method according to claim 4, wherein said compress encoding which reduces said delay includes encoding which employs a field structure.

22. An image data transmission method according to claim 5, wherein said compress encoding which reduces said delay includes encoding which employs a field structure.

23. An image data transmission method according to claim 6, wherein said compress encoding which reduces said delay includes encoding which employs a field structure.

* * * * *